US010779132B2

(12) United States Patent
Watanabe et al.

(10) Patent No.: US 10,779,132 B2
(45) Date of Patent: Sep. 15, 2020

(54) WIRELESS TERMINAL AND METHOD FOR MESSAGING

(71) Applicant: NEC Corporation, Minato-ku, Tokyo (JP)

(72) Inventors: Shingo Watanabe, Tokyo (JP); Shigeru Asai, Tokyo (JP); Hideto Shibouta, Tokyo (JP); Kenji Wakafuji, Tokyo (JP); Masakazu Ono, Tokyo (JP); Masato Kudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 450 days.

(21) Appl. No.: 15/528,183

(22) PCT Filed: Jul. 22, 2015

(86) PCT No.: PCT/JP2015/003668
§ 371 (c)(1),
(2) Date: May 19, 2017

(87) PCT Pub. No.: WO2016/092715
PCT Pub. Date: Jun. 16, 2016

(65) Prior Publication Data
US 2017/0332216 A1 Nov. 16, 2017

(30) Foreign Application Priority Data
Dec. 8, 2014 (JP) .................................. 2014-247869

(51) Int. Cl.
*G06F 15/16* (2006.01)
*H04W 4/12* (2009.01)
(Continued)

(52) U.S. Cl.
CPC ............... *H04W 4/12* (2013.01); *H04L 51/04* (2013.01); *H04M 11/00* (2013.01); *H04W 4/029* (2018.02);
(Continued)

(58) Field of Classification Search
CPC ......... H04W 4/12; H04W 4/029; H04W 4/90; H04W 84/12; H04W 84/18; H04W 88/06;
(Continued)

(56) References Cited

U.S. PATENT DOCUMENTS 6,621,795 B1 * 9/2003 Redi ..................... H04L 1/1867
370/235
8,364,129 B1 * 1/2013 Beyer, Jr. .......... H04M 1/72572
455/414.2
(Continued)

FOREIGN PATENT DOCUMENTS

CN 101478773 A 7/2009
CN 102355492 A 2/2012
(Continued)

OTHER PUBLICATIONS

Alslaim et al.; "A comparative study of MANET routing protocols"; Apr. 29, 2014; IEEE; 9 pages (Year: 2014).*
(Continued)

*Primary Examiner* — Richard G Keehn (57) ABSTRACT

A processor (103) in a wireless terminal (10) executes a communication service application to thereby perform an operation as a client for using a communication service. Further, in an abnormal situation where the wireless terminal (10) cannot access a server system (50) of an operator of the communication service, the processor (103) executes a predetermined activation procedure in the wireless terminal (10) without passing through the server system (50) to thereby activate a special account in the wireless terminal (10). This makes it possible, for example, to perform communication by the special account using an online service application installed in the wireless terminal during an abnormal situation where the wireless terminal cannot access the online service server.

16 Claims, 9 Drawing Sheets

(51) Int. Cl.
| | | |
|---|---|---|
| *H04W 4/029* | (2018.01) | |
| *H04M 11/00* | (2006.01) | |
| *H04W 4/90* | (2018.01) | |
| *H04L 12/58* | (2006.01) | |
| *H04W 84/12* | (2009.01) | |
| *H04W 84/18* | (2009.01) | |
| *H04W 88/06* | (2009.01) | |

(52) U.S. Cl.
CPC .............. *H04W 4/90* (2018.02); *H04W 84/12* (2013.01); *H04L 51/26* (2013.01); *H04L 51/32* (2013.01); *H04L 51/38* (2013.01); *H04W 84/18* (2013.01); *H04W 88/06* (2013.01)

(58) Field of Classification Search
CPC ........ H04M 11/00; H04L 51/04; H04L 51/26; H04L 51/38; H04L 51/32
See application file for complete search history.

(56) References Cited

U.S. PATENT DOCUMENTS

| | | | | |
|---|---|---|---|---|
| 8,538,393 | B1* | 9/2013 | Beyer, Jr. .............. | H04W 4/90 455/414.2 |
| 9,380,018 | B2* | 6/2016 | Brady ...................... | H04L 51/38 |
| 2005/0117530 | A1* | 6/2005 | Abraham .......... | H04W 52/0232 370/310 |
| 2006/0268902 | A1 | 11/2006 | Bonner | |
| 2007/0230390 | A1* | 10/2007 | Takatani ............... | H04J 3/1617 370/315 |
| 2007/0294379 | A1* | 12/2007 | Jiang ........................ | H04L 41/04 709/223 |
| 2009/0247111 | A1 | 10/2009 | Sennett et al. | |
| 2009/0305708 | A1 | 12/2009 | Matsui et al. | |
| 2010/0124900 | A1* | 5/2010 | Lui ................... | H04M 1/72541 455/404.2 |
| 2010/0279647 | A1 | 11/2010 | Jacobs et al. | |
| 2010/0309785 | A1* | 12/2010 | Sassi ................... | H04L 12/4633 370/232 |
| 2011/0010560 | A1* | 1/2011 | Etchegoyen ........ | G06F 11/2025 713/189 |
| 2011/0072098 | A1 | 3/2011 | Moudy et al. | |
| 2011/0227730 | A1 | 9/2011 | Stevenson et al. | |
| 2012/0216241 | A1* | 8/2012 | Alon ........................ | H04L 63/20 726/1 |
| 2013/0110534 | A1* | 5/2013 | Iasella .................... | G06Q 50/22 705/2 |
| 2013/0149987 | A1 | 6/2013 | Cheng et al. | |
| 2013/0250758 | A1 | 9/2013 | Chen et al. | |
| 2014/0051379 | A1 | 2/2014 | Ganesh et al. | |
| 2014/0195626 | A1 | 7/2014 | Ruff et al. | |
| 2014/0233458 | A1* | 8/2014 | Georgescu ............ | H04W 76/50 370/328 |
| 2015/0006948 | A1* | 1/2015 | Yamabiraki ......... | G06F 11/2028 714/4.11 |
| 2015/0172116 | A1* | 6/2015 | Fischer ............... | G06F 11/2033 370/384 |
| 2016/0029430 | A1* | 1/2016 | Mishra .................. | H04W 36/30 370/254 |
| 2016/0135064 | A1* | 5/2016 | Sergeev .............. | H04L 41/0668 455/418 |
| 2016/0138856 | A1* | 5/2016 | Wilson .................... | F25D 29/00 700/300 |
| 2016/0165641 | A1* | 6/2016 | Narayanan ............ | H04W 76/14 455/404.1 |

FOREIGN PATENT DOCUMENTS

| | | |
|---|---|---|
| CN | 102857403 A | 1/2013 |
| EP | 2587746 A1 | 5/2013 |
| JP | 2006-139353 A | 6/2006 |
| JP | 2006-319555 A | 11/2006 |
| JP | 2008-543177 A | 11/2008 |
| TW | M389556 U1 | 10/2010 |
| TW | 201131379 A | 9/2011 |
| TW | 201325282 A | 6/2013 |
| TW | 201340636 A | 10/2013 |
| WO | 2009/032520 A2 | 3/2009 |

OTHER PUBLICATIONS

International Search Report for PCT Application No. PCT/JP2015/003668, dated Oct. 13, 2015.
Australian Office Action for AU Application No. 2015358828 dated Mar. 2, 2018.
Taiwanese Office Action for TW Application No. 104126801 dated Apr. 18, 2018 with English Translation.
Japanese Office Action for JP Application No. 2016-563391 dated May 15, 2018 with English Translation.
Extended European Search Report for EP Application No. EP15867882.1 dated Jul. 2, 2018.
Chinese Office Action for CN Application No. 201580067017.1 dated Sep. 27, 2019 with English Translation.

* cited by examiner

WIRELESS TERMINAL AND METHOD FOR MESSAGING

This application is a National Stage Entry of PCT/JP2015/003668 filed on Jul. 22, 2015, which claims priority from Japanese Patent Application 2014-247869 filed on Dec. 8, 2014, the contents of all of which are incorporated herein by reference, in their entirety.

TECHNICAL FIELD

The present disclosure relates to a wireless communication system and, more particularly, to an apparatus and a method for messaging by a wireless terminal.

BACKGROUND ART

As highly functional wireless terminals such as smartphones and tablet computers have become widespread, and broadband wireless communication services such as Long Term Evolution (LTE), public wireless local area network (WLAN), and the like are also widespread, instant messaging (IM) services have been widely used (e.g., see Patent Literature 1 and 2) in wireless terminals. IM provides real-time text-based communication among a plurality of users using the same IM application. Wireless terminals used by these users execute the same IM application. IM may be referred to as mobile messaging, text chat, text-based messaging, or interactive messaging.

In the present specification, an application that provides text or text-based messaging among a plurality of online users using the same application, regardless of whether or not it is specialized in IM, is defined as an IM application. Typical examples of the IM application are LINE, WhatsApp, Text Me!, Viber, Kakao Talk, Skype, Google Hangouts, iMessage, Twitter, Facebook, and the like. The names of these IM applications are trademarks or registered trademarks of the operators of the respective IM services.

IM is provided via an IM server system managed by the operator of the IM service. Specifically, a wireless terminal of a first user using the IM application transmits a message destined for a second user to the IM server system. Then, the IM server system transmits this message destined for the second user to a wireless terminal of the second user using the same IM application.

Further, some IM services offer special accounts different from normal user accounts (hereinafter referred to as normal accounts) that are assigned to normal users. The special accounts have authority to broadcast a message to many more accounts than the normal accounts do. For example, the special accounts are assigned to government offices, commercial enterprises, commercial facility operators, publishers, broadcasting organizations, and the like and are used to widely distribute information regarding public services, products, commercial services, magazines, television programs, etc. to a large number of users.

For example, a web-based operation is used to send a message originated by the special account (hereinafter referred to as a special message). Specifically, a user of the special account accesses the IM server system (web server) using a web browser and sends a special message through a web-based management screen.

Moreover, a mechanism that allows a wireless terminal in which the normal account has been set to send special messages has also been provided. Specifically, the user of the special account registers, in the IM server system, one or more normal accounts used to send special messages. In an example, the IM server system may provide each special account with a bot account for sending special messages. In this case, the user of each special account registers the corresponding bot account, which is used for sending special messages, in an account list (which is commonly referred to as friends or buddies) of a normal account and requests the bot account to register this normal account in an account list (friends or buddies) of the bot account. The bot account requests the user to enter a password when registering the normal account. This password is issued to the user of the special account by the IM service operator and the user can obtain it, for example, through the web-based management screen of the special account. After the normal account is successfully registered in the account list (friends or buddies) of the bot account, the user of the special account sends a message destined for the bot account from the registered normal account. The IM server system delivers this message, which has been received by the bot account from the registered normal account, to receivers associated with the special account as a special message.

CITATION LIST

Patent Literature

Patent Literature 1: U.S. Patent Publication No. 2011/0072098

Patent Literature 2: European Patent Publication No. 2587746

SUMMARY OF INVENTION

Technical Problem

The present inventors have studied a mechanism for enabling communication of the IM application even when a disaster such as a severe earthquake occurs. When a disaster such as a severe earthquake occurs, facilities of the cellular network and public WLAN may stop or the IM server system itself may stop, which may disable wireless terminals from accessing the IM server system. The present inventors have studied about architecture in which wireless terminals (smartphone etc.) use their WLAN communication functions or Bluetooth (registered trademark) communication functions and the like to autonomously form a wireless multi-hop network and to perform communication of the IM application on the wireless multi-hop network.

The wireless multi-hop network is a mobile ad-hoc network (MANET), a disruption tolerant network (DTN), or a combination thereof. A disruption tolerant network may be referred to as a delay tolerant network or a disconnect tolerant network. In the present specification, a disruption/delay/disconnect tolerant network is collectively denoted as DTN. MANET is typically based on the premise that there is a communication path between a source node and a destination node. Specific examples of MANET are ZigBee, ZigBee PRO, ZigBee IP, and an ad-hoc mode WLAN (IEEE 802.11). On the other hand, DTN is based on the premise that a temporary or intermittent communication disconnection occurs. In other words, DTN is based on the premise that there is no stable communication path between the source node and the destination node at least at a certain point. In order to deal with temporary or intermittent communication disconnections, each DTN node performs a store-and-forward operation. In this sense, DTN can be referred to as a store-and-forward type wireless multi-hop network.

In an example, an IM application running on a wireless terminal receives a message through a wireless multi-hop network, compare the source account ID of the received message with the account list (friends or buddies) stored in the wireless terminal, and display the received message for a user if its source account ID is included in the account list. Otherwise if not, the IM application does not display the received message. Exchange of messages among normal accounts without passing through the IM server system can be implemented by this mechanism.

However, it is not easy to send special messages originated by the special account from a wireless terminal without passing through the IM server system. This is because the special account is not directly associated with the IM application running on a wireless terminal, and transmission of special messages requires accessing the IM server system. That is, as described above, transmission of special messages can be performed on the web-based management screen by accessing the IM server system (web server). Alternatively, transmission of special messages can be performed by transmitting a message to the bot account provided by the IM server system. However, the account that is set in the IM application installed in the wireless terminal is merely a normal account, and is not the special account. Therefore, while a wireless multi-hop operation is performed under a disaster situation, wireless terminals cannot send special messages originated by the special account. For example, government officials may want to widely distribute information to citizens using the special account assigned to their government office. However, the government officials cannot use their special account unless they can access the IM server system of the IM service operator.

Note that the above-mentioned problem may occur not only in messaging services (IM services) but also in other communication services (e.g., online services such as various social networking services (SNS)). In communication services (e.g., SNS) other than the IM service, special accounts may be distinguished from normal accounts. Here, the normal account is a normal user account assigned to a normal user. On the other hand, the special account means an account provided with authority different from that of the normal account by the communication service operator. For example, the special account may be an account of a corporation or individual that provides highly public information, such as a government office, an administrative agency, a commercial enterprise, or a broadcasting organization, specially authenticated by the communication service operator. The special account may have authority to widely disclose information to the public unlike the normal account, may have authority to communicate with many more accounts than the normal account do, may have authority to widely distribute information to many more accounts than the normal account do, or may have authority to collect information from many more accounts than the normal account do.

Accessing to a communication service server may be necessary in order to use a special account even in communication services other than IM services. In this case, for example, the special accounts cannot be used unless the communication service server can be accessed under a disaster situation. For example, government officials may want to widely distribute information to citizens using the special account assigned to their government office. However, the government officials cannot use their special account unless they can access the communication service server.

Thus, one of objects to be attained by embodiments disclosed herein is to provide a wireless terminal, a method, and a program that support performing communication of a special account using a communication service application (e.g., IM application or SNS application) installed in a wireless terminal in an abnormal situation where the wireless terminal cannot access a communication service server (e.g., IM server or SNS server). The other objects or problems and novel features will be made apparent from the following description and the accompanying drawings.

Solution to Problem

In one example aspect, a wireless terminal includes a wireless transceiver and at least one processor. The at least one processor is configured to execute a communication service application installed in the wireless terminal to thereby perform an operation as a client for using a communication service. The operation as the client includes:

(a) performing communication by a normal account via a server system of an operator of the communication service;

(b) performing communication by a special account via the server system, the special account having authority different from that of the normal account; and (c) in an abnormal situation where the wireless terminal cannot access the server system, executing a predetermined activation procedure in the wireless terminal without passing through the server system to thereby activate the special account in the wireless terminal.

In another example aspect, a method performed by at least one processor in a wireless terminal includes:

(a) performing communication by a normal account via a server system of an operator of a communication service;

(b) performing communication by a special account via the server system, the special account having authority different from that of the normal account; and (c) in an abnormal situation where the wireless terminal cannot access the server system, executing a predetermined activation procedure in the wireless terminal without passing through the server system to thereby activate the special account in the wireless terminal.

In another example aspect, a wireless terminal includes a wireless transceiver and at least one processor. The at least one processor operates to define an activation procedure for activating a special account and transmit activation verification data for verifying correctness of the activation procedure to another wireless terminal. The special account is an account for using a communication service provided by a server system and has authority different from that of a normal account. The activation procedure includes a procedure for activating the special account in the other wireless terminal without passing through the server system in an abnormal situation where the other wireless terminal cannot access the server system.

In another example aspect, a method performed by at least one processor in a wireless terminal device includes defining an activation procedure for activating a special account and transmitting activation verification data for verifying correctness of the activation procedure to another wireless terminal. The special account is an account for using a communication service provided by a server system and has authority different from that of a normal account. The activation procedure includes a procedure for activating the special account in the other wireless terminal without passing through the server system in an abnormal situation where the other wireless terminal cannot access the server system.

In an example aspect, a program includes a set of instructions (software codes) that, when loaded into a computer, causes the computer to perform any one of the above-described methods.

Advantageous Effects of Invention

According to the above-described example aspects, it is possible to provide a wireless terminal, a method, and a program that support performing communication of a special account using a communication service application installed in a wireless terminal in an abnormal situation where the wireless terminal cannot access a communication service server.

DESCRIPTION OF EMBODIMENTS

Specific embodiments are described hereinafter in detail with reference to the drawings. The same or corresponding elements are denoted by the same symbols throughout the drawings, and repetitive explanations thereof are omitted as necessary for the sake of clarity.

First Embodiment

Figure 1:
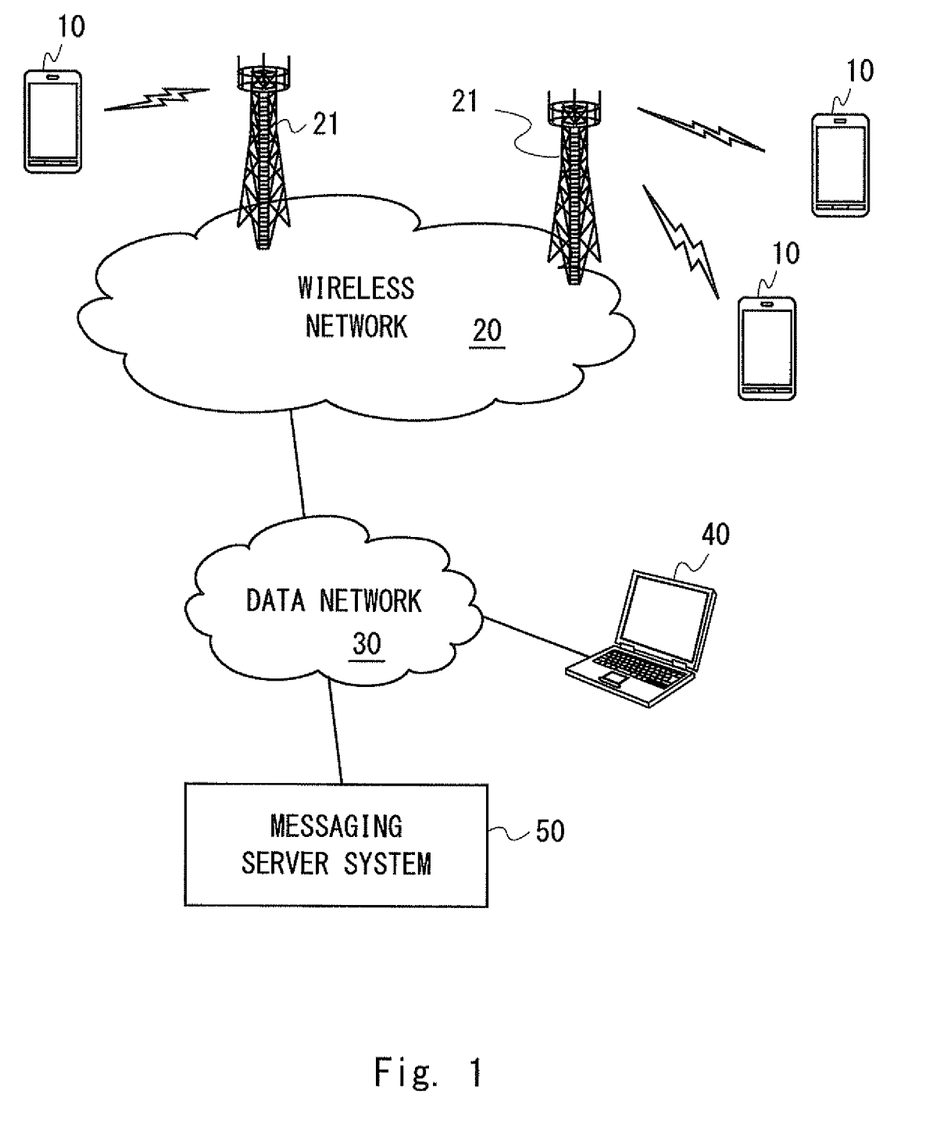
FIG. 1 is a diagram illustrating a configuration example of a system for instant messaging according to a first embodiment.

FIG. 1 shows a configuration example of a system for instant messaging according to this embodiment. Each wireless terminal 10 (e.g., smartphone or tablet computer) connects its wireless interface to a base station (or access point) 21 within a wireless network 20. Each wireless terminal 10 executes an IM application and communicates with an IM server system 50 via the wireless network 20 and a data network 30. As a result, wireless terminals 10, which are executing the same IM application, can exchange messages with each other via the IM server system 50. Each wireless terminal 10 may communicate with a computer 40 executing the IM application. The computer 40 is connected to the data network 30. The wireless network 20 includes, for example, a Universal Mobile Telecommunications System (UMTS), Long Term Evolution (LTE), CDMA 2000 (1×RTT, High Rate Packet Data (HRPD)) system, Global System for Mobile communications (GSM (registered trademark))/ General Packet radio service (GPRS) system, WiMAX (IEEE 802.16-2004), or mobile WiMAX (IEEE 802.16e-2005). Additionally or alternatively, the wireless network 20 may include an infrastructure mode WLAN (IEEE 802.11). The data network 30 includes, for example, the Internet.

Figure 2:
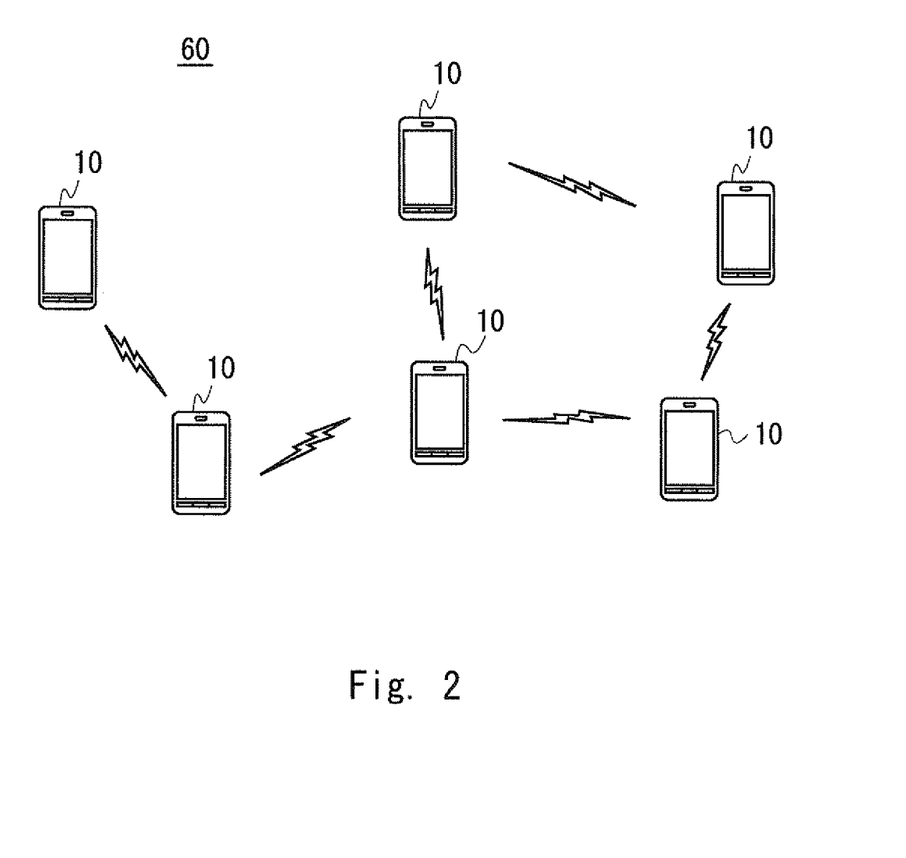
FIG. 2 is a diagram illustrating a configuration example of a system for instant messaging according to the first embodiment.

Further, as shown in FIG. 2, wireless terminals 10 can perform wireless multi-hop communication. The wireless terminals 10 form or participate in a wireless multi-hop network 60 and communicate with each other. The wireless multi-hop network 60 is a MANET, a DTN, or a combination thereof.

Figure 3:
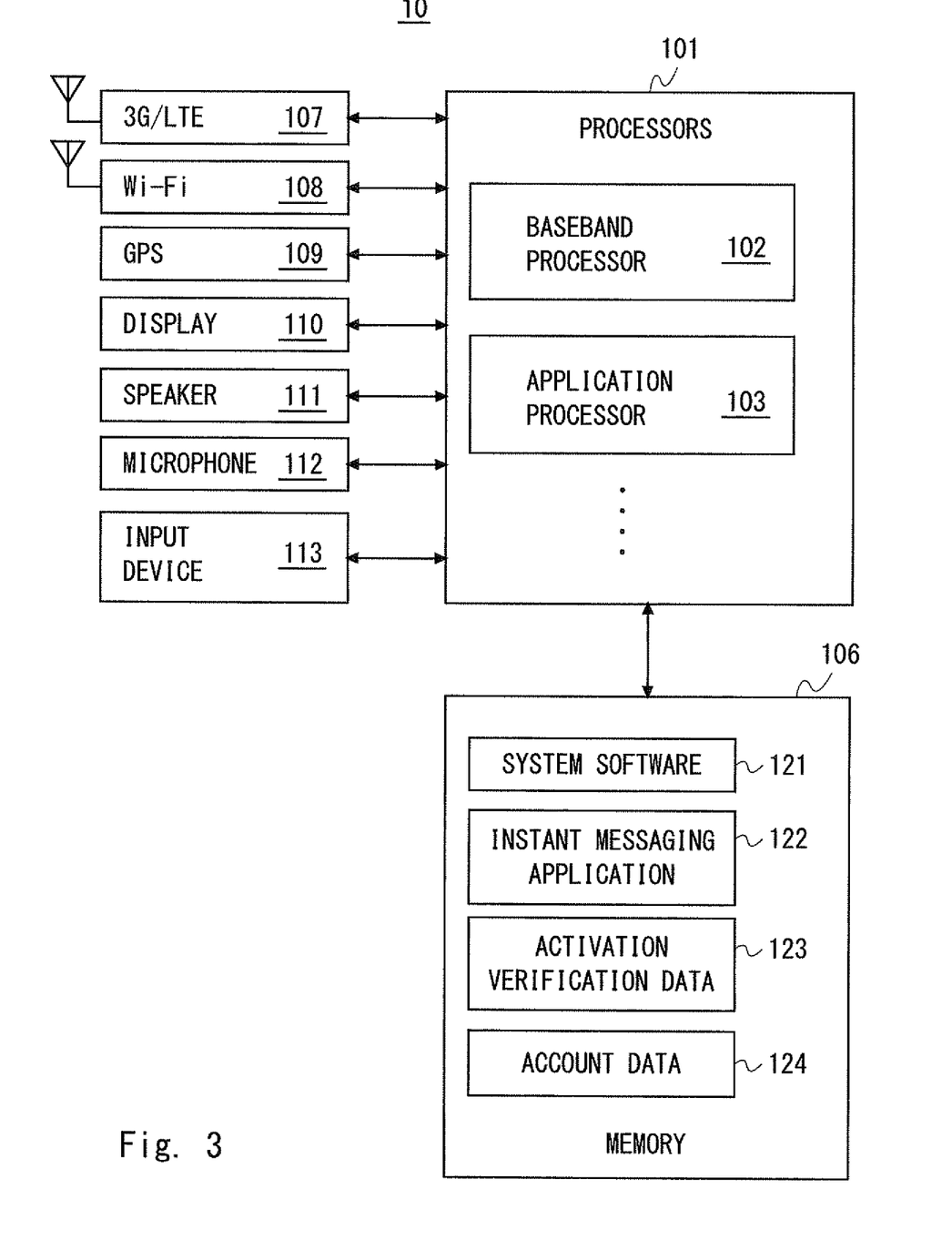
FIG. 3 is a diagram illustrating a configuration example of a wireless terminal according to the first embodiment.

FIG. 3 shows a configuration example of the wireless terminal 10. The wireless terminal 10 includes processors 101. The processors 101 include, for example, a baseband processor 102 and an application processor 103.

The baseband processor 102 provides connectivity to the wireless network 20 in accordance with a wireless communication standard. That is, the baseband processor 102 performs error correction coding, rate matching, interleaving, modulation symbol mapping, band limitation or the like on transmission data, to thereby generate a transmission baseband signal. Moreover, the baseband processor 102 restores a received data sequence from a received baseband signal and performs error correction on the received data sequence in accordance with the channel coding scheme used in the counterpart node (i.e., base station 21 or other wireless terminals 10). The baseband processor 102 further performs communication control including transmission and reception of control messages. The baseband processor 102 may also be referred to as a modem (e.g., LTE modem or 3G modem).

The application processor 103 loads, from a memory 106, system software 121 and various applications (e.g., web browser, mailer, camera operation application, music playback application, and video playback application) including an IM application 122 and executes these software programs. The system software 121 includes an operating system and middleware. The application processor 103 thereby provides various functions (e.g., a user interface, a software execution environment, a user application) of the wireless terminal 10 (e.g., a smartphone or a tablet computer).

The wireless terminal 10 operates as an instant messaging (IM) client by executing the IM application 122 by the application processor 103. The IM application 122 (or the wireless terminal 10 operating as an IM client) uses activation verification data 123 and account data 124. The activation verification data 123 is used in an authentication procedure for activating a special account in the wireless terminal 10. The account data 124 is data related to a user account (e.g., account ID and account list (friends or buddies)) in order to use the IM service. The activation verification data 123 and the account data 124 may be stored in the memory 106 in an encrypted form.

The processors 101 may include other processors and circuits not shown in FIG. 3, such as a graphics processor (graphics processing unit (GPU)) for displaying images, a multimedia processor for encoding and decoding high-definition (HD) video and the like, a display controller for controlling a display, a power management integrated circuit (IC) for controlling power supply and charging, and the like.

The baseband processor 102 may be, for example, a Digital Signal Processor (DSP), a microprocessor, a Micro Processing Unit (MPU), or a Central Processing Unit (CPU). Likewise, the application processor 103 may also be a microprocessor, an MPU, or a CPU. Each of the baseband processor 102 and the application processor 103 may be physically formed on a single semiconductor chip or on a plurality of semiconductor chips. Instead, the processors 101, which include the baseband processor 102 and the application processor 103, may be integrated on a single semiconductor chip. Such an IC device is referred to as an SoC (system on a chip) device or a system LSI (large scale integration).

The memory 106 consists of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), a Programmable ROM (PROM), a flash memory, a hard disk drive, or a combination thereof.

The wireless terminal 10 further includes various devices coupled to the processors 101. For example, as shown in FIG. 3, the wireless terminal 10 includes wireless transceivers 107 and 108, a global positioning system (GPS) receiver 109, a display 110, a speaker 111, a microphone 112, and an input device 113.

The wireless transceiver 107 includes, for example, an Analog Front End (AFE) conforming to the physical layer of 3G/LTE. The wireless transceiver 108 includes, for example, an AFE conforming to the physical layer of WLAN (Wi-Fi (registered trademark)). That is, each of the radio transceivers 107 and 108 is coupled to an antenna and is configured to receive radio signals via the antenna and transmit radio signals via the antenna.

The input device 113 is a device for accepting operations by a user. The input device 113 includes, for example, at least one of a device for accepting input operations manually performed by the user, a microphone for accepting sound input by the user, and a device for accepting an eye-gaze input by the user. The device for accepting input operations manually performed by the user is, for example, a keyboard, a keypad, a touch panel, a touch pad, or a mouse.

The following provides a detailed description of an operation of the wireless terminal 10 operating as the IM client. As has already been mentioned, the wireless terminal 10 executes the IM application 122 to thereby operate as the IM client. Specifically, the wireless terminal 10 sends messages originated by the normal account of the user and receives messages destined for the normal account, via the IM server system 50 of the messaging service operator. The user's normal account is set in the IM application through an operation by the user to the input device 113 or the like.

The wireless terminal 10 operating as the IM client is further able to send special messages originated by the special account via the IM server system 50. As has been mentioned, special accounts have authority to broadcast messages to many more accounts than normal accounts do. For example, special accounts are assigned to government offices, commercial enterprises, commercial facility operators, publishers, broadcasting organizations, and the like and are used to widely distribute information regarding public services, products, commercial services, magazines, television programs, etc. to a large number of users.

Figure 4:
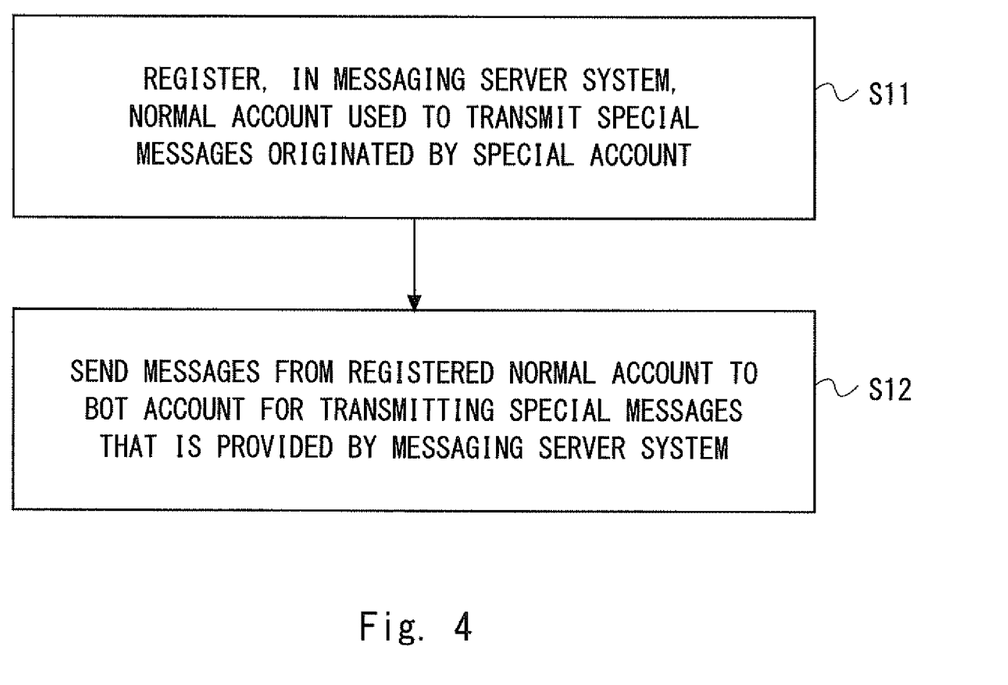
FIG. 4 is a flowchart illustrating an example of a method for transmitting an instant message at a normal time according to the first embodiment.

A specific example of transmitting a message originated by the special account (hereinafter referred to as a special message) is described herein with reference to FIG. 4. In Step S11, the user registers, in the IM server system 50, the normal account used to send special messages. In an example, the IM server system 50 may provide each special account with a bot account for sending special messages. In this case, the user registers the corresponding bot account, which is used for sending special messages, in an account list (which is commonly referred to as friends or buddies) of his/her normal account and requests the bot account to register this normal account in an account list (friends or buddies) of the bot account. The bot account requests the user to enter a password when registering the normal account. This password is issued to the user of the special account by the IM service operator and the user can obtain it, for example, through the web-based management screen of the special account. After the normal account is successfully registered in the account list (friends or buddies) of the bot account, the user is allowed to transmit special messages from the wireless terminal 10.

In Step S12, the user operates the wireless terminal 10 to send a message from the registered normal account to the bot account. The IM server system 50 delivers this message, which has been received by the bot account from the registered normal account, to receivers associated with the special account as a special message.

Alternatively, for example, a web-based operation may be used to send a message originated by the special account (i.e., a special message). Specifically, the user may access the IM server system (web server) using a web browser application of the wireless terminal 10 and send a special message through a web-based management screen.

The wireless terminal 10 operating as the IM client is further configured to use the IM application 122 to exchange messages among users (wireless terminals 10) using the same IM application 122, in an abnormal situation where the wireless terminals cannot access the IM server system 50. Specifically, the wireless terminal 10 receives messages through the wireless multi-hop network 60 as shown in FIG. 2. The IM application 122 ruining on the wireless terminal 10 gets a received message from a lower layer (wireless transceiver 108 and baseband processor 102), compares the source account ID of the message with the account list (friends or buddies) stored in the wireless terminal 10, and displays the message for the user if its source account ID is included in the account list. Otherwise if not, the IM application does not display the received message. The account list is contained in the account data 124 and stored in the memory 106.

Moreover, the wireless terminal 10 operating as the IM client is configured to execute a predetermined activation procedure in the wireless terminal 10 without passing through the IM server system 50 to thereby activate the special account in the wireless terminal 10 in an abnormal situation where the wireless terminal 10 cannot access the IM server system 50. The activation of the special account includes enabling the wireless terminal 10 to send special messages originated by the special account without passing through the IM server system 50.

Figure 5:
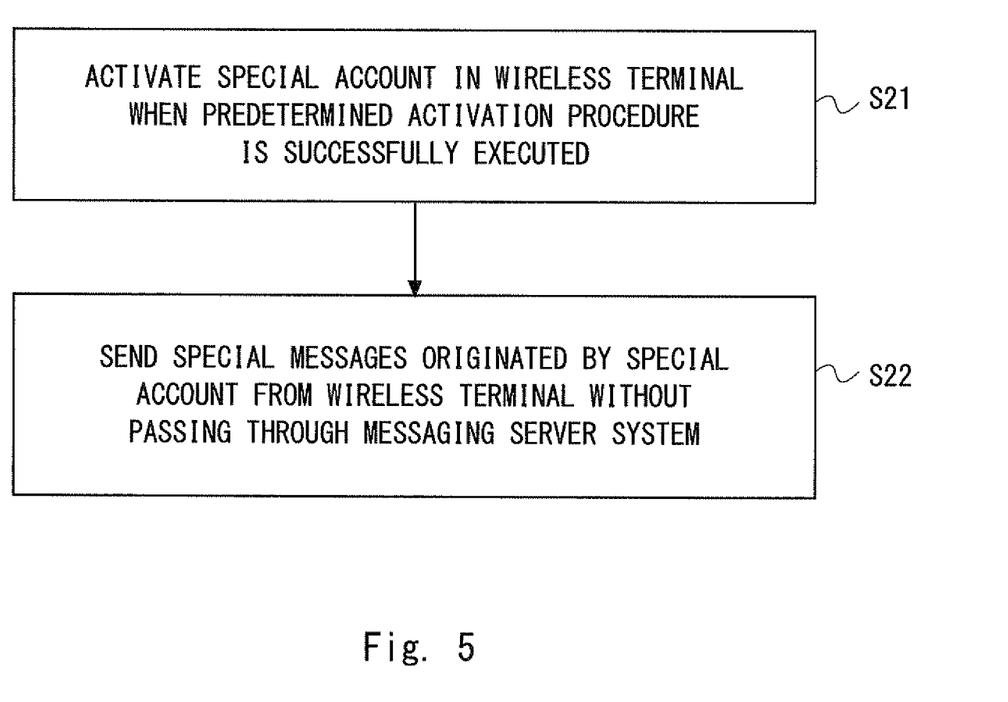
FIG. 5 is a flowchart illustrating an example of a method for transmitting an instant message in an abnormal situation where a messaging server system according to the first embodiment cannot be accessed.
Figure 6:
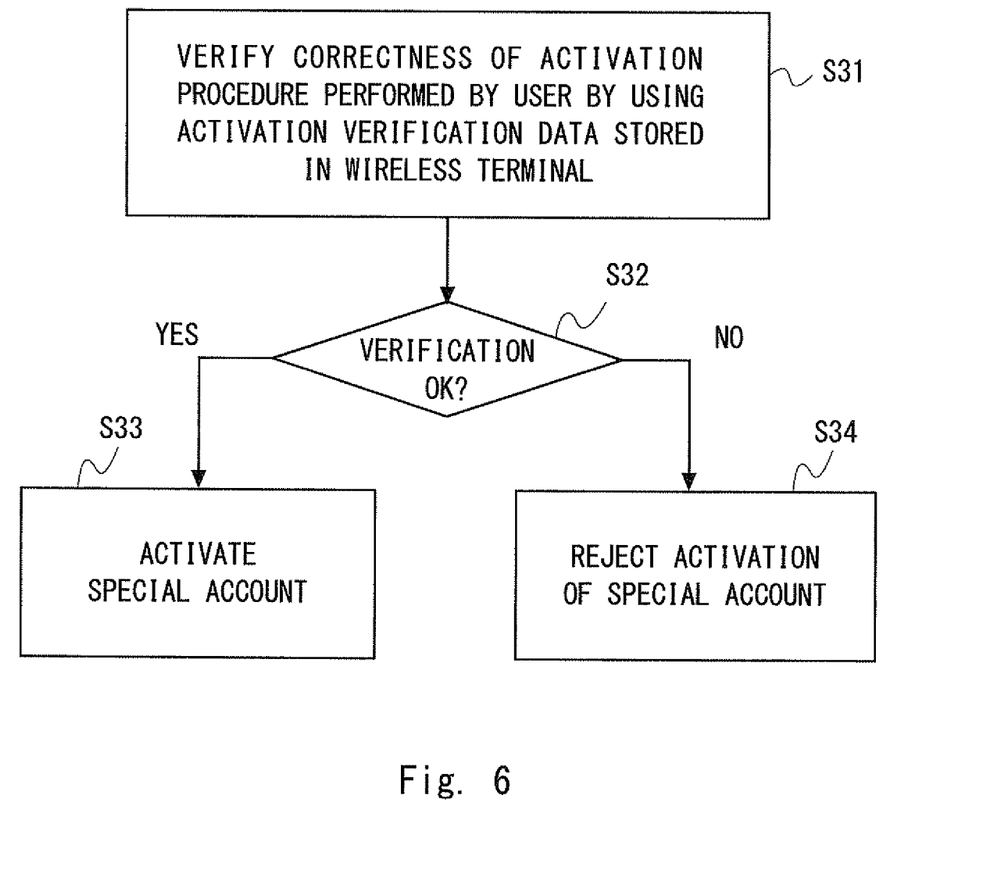
FIG. 6 is a flowchart illustrating an example of a method for activating a special account according to the first embodiment.

FIG. 5 is a flowchart showing an example of the procedure for activating the special account. In Step S21, the wireless terminal 10 operating as the IM client activates the special account in the wireless terminal 10 in response to detecting that the activation procedure is successfully executed. The correctness of the activation procedure may be verified using the method shown in FIG. 6. In Step S31 of FIG. 6, the wireless terminal 10 operating as the IM client verifies the activation procedure performed by the user by using the activation verification data 123 stored in the memory 106 of the wireless terminal 10. The activation verification data 123 includes information for verifying the activation procedure. For example, the activation verification data 123 includes position information indicating a position where the activation procedure should be performed, a normal account ID permitted to execute the activation, threshold data used for numerical determination for the activation, and the like. When the correctness of the activation procedure is confirmed (YES in Step S32), the wireless terminal 10 operating as the IM client activates the special account (Step S33). On the other hand, when the correctness of the activation is not confirmed (NO in Step S32), the wireless terminal 10 operating as the IM client rejects the activation of the special account (Step S34).

Referring back to FIG. 5, in Step S22, the wireless terminal 10 operating as the IM client sends a special message originated by the special account from the wireless terminal 10 without passing through the IM server system 50. The wireless terminal 10 may send a special message to the wireless multi-hop network 60 as shown in FIG. 2. The special message is received by the other wireless terminals 10 participating in the wireless multi-hop network 60. If the other wireless terminals 10 execute the same IM application 122, and the special account is included in their account lists (friends or buddies), then the other wireless terminals 10 display the received special message for their users.

As is understood from the above description, the wireless terminal 10 according to this embodiment can activate the special account in the wireless terminal 10 even in an abnormal situation where the wireless terminal 10 cannot access the IM server system 50. In other words, the wireless terminal 10 can use the special account without accessing the IM server system 50 of the IM service operator. Thus, for example, the wireless terminal 10 can send special messages originated by the special account even in an abnormal situation where the wireless terminal 10 cannot access the IM server system 50. Further, for example, the wireless terminal 10 can send special messages originated by the special account while performing a wireless multi-hop operation under a disaster situation.

Next, some specific examples of the procedure for activating the special account are described. These specific examples may be used separately or in any combination.

As an example, in the activation procedure, the wireless terminal 10 may determine whether a correct password (passcode) has been successfully entered by the user. However, with use of password authentication alone, there may be a risk of spoofing caused by password leakage. Further, a user may forget his/her password and thus cannot activate the special account. Furthermore, a protection system that restricts the activation of the special account unless a special circumstance such as a disaster occurs may be necessary. Moreover, it may be necessary to prevent the same special account from being activated simultaneously in two or more wireless terminals 10. In order to address at least one of these additional matters, one or more following methods may be used in place of or in combination with the password authentication.

As an example, in the activation procedure, the wireless terminal 10 may determine whether the wireless terminal 10 is positioned at a predetermined place or area. For example, the wireless terminal 10 may use the position information obtained by the GPS receiver 109 to confirm that the wireless terminal 10 is positioned at the predetermined place or area. Instead, the wireless terminal 10 may uses a geographical indication contained in a message received by the normal account from another account, to confirm that the wireless terminal 10 is positioned at the predetermined place or area. For example, the wireless terminal 10 may activate the special account assigned to a specific municipality on the condition that the wireless terminal 10 is positioned within the specific municipality or positioned at a specific place (e.g., location of a government or public office) within the specific municipality. For example, the use of position authentication of the wireless terminal 10 in combination with the password authentication can contribute to preventing spoofing from occurring due to password leakage. Further, the use of the position authentication of the wireless terminal 10 in place of the password authentication can contribute to avoiding a situation in which the user forgets his/her password and thus cannot activate the special account.

As an example, in the activation procedure, the wireless terminal 10 may utilize behavior(s) of one or more other wireless terminals 10. Specifically, in the activation procedure, the wireless terminal 10 may determine whether a message(s) containing a predetermined indication used in an abnormal situation has been received from one or more neighboring other wireless terminals 10. In order to avoid an erroneous determination, the wireless terminal 10 may confirm that frequency or rate of reception of the message containing the predetermined indication exceeds a predetermined threshold. The predetermined indication may indicate, for example, that a disaster such as an earthquake has occurred (disaster occurrence flag). Alternatively, the predetermined indication may indicate that the IM application 122 is in an operation mode for exchanging messages without passing through the IM server system 50 (i.e., ad-hoc mode). It is thus possible to prevent erroneous or intentional activation of the special account in a situation other than abnormal situations.

As an example, in the activation procedure, the wireless terminal 10 may determine whether a predetermined warning message has been received. The predetermined warning message may be, for example, an indication related to Public Warning System (PWS) defined by 3rd Generation Partnership Project (3GPP). PWS includes Earthquake and Tsunami Warning System (ETWS) used in Japan, Commercial Mobile Alert System (CMAS) used in North America, Korean Public Alert System (KPAS) used in Korea, and EU-ALERT used in European countries. It is thus possible to prevent erroneous or intentional activation of the special account in a situation other than abnormal situations.

As an example, in the activation procedure, the wireless terminal 10 may determine that the wireless terminal 10 has not received any special messages originated by the special account. It is thus possible to prevent the same special account from being activated simultaneously in two or more wireless terminals 10.

Next, some specific examples of procedures for deactivating the special account after the special account has been activated are described. The deactivation of the special account includes prohibiting the transmission of special messages without passing through the IM server system 50. The following specific examples may be used separately or in any combination.

As an example, the wireless terminal 10 may deactivate the special account in the wireless terminal 10 in response to the wireless terminal 10 moving away from the predetermined place or area.

As an example, the wireless terminal 10 may deactivate the special account in response to the wireless terminal 10 (wireless transceiver 107 or 108) disconnecting from a communication network. In other words, the wireless terminal 10 may deactivate the special account in the wireless terminal 10 in response to the wireless terminal 10 disconnecting from the wireless multi-hop network 60.

As an example, the wireless terminal 10 may deactivate the special account in the wireless terminal 10 in response to receiving an instruction from the IM server system 50.

As an example, the wireless terminal 10 may deactivate the special account in the wireless terminal 10 in response to receiving a denial message(s) indicating that the special account is not approved from one or more neighboring other wireless terminals 10. This makes it possible to prevent unintended use of the special accounts (for example, exploit of it by spoofing).

In some implementations, the activation procedure or activation verification data 123 for verifying the activation procedure may be defined (created) by the wireless terminal 10 itself that executes the activation procedure. Alternatively, in some implementations, one of the wireless terminals 10 may define (create) the activation procedure or activation verification data 123 and send it to another wireless terminal 10 that is to execute the activation procedure.

Second Embodiment

Figure 7:
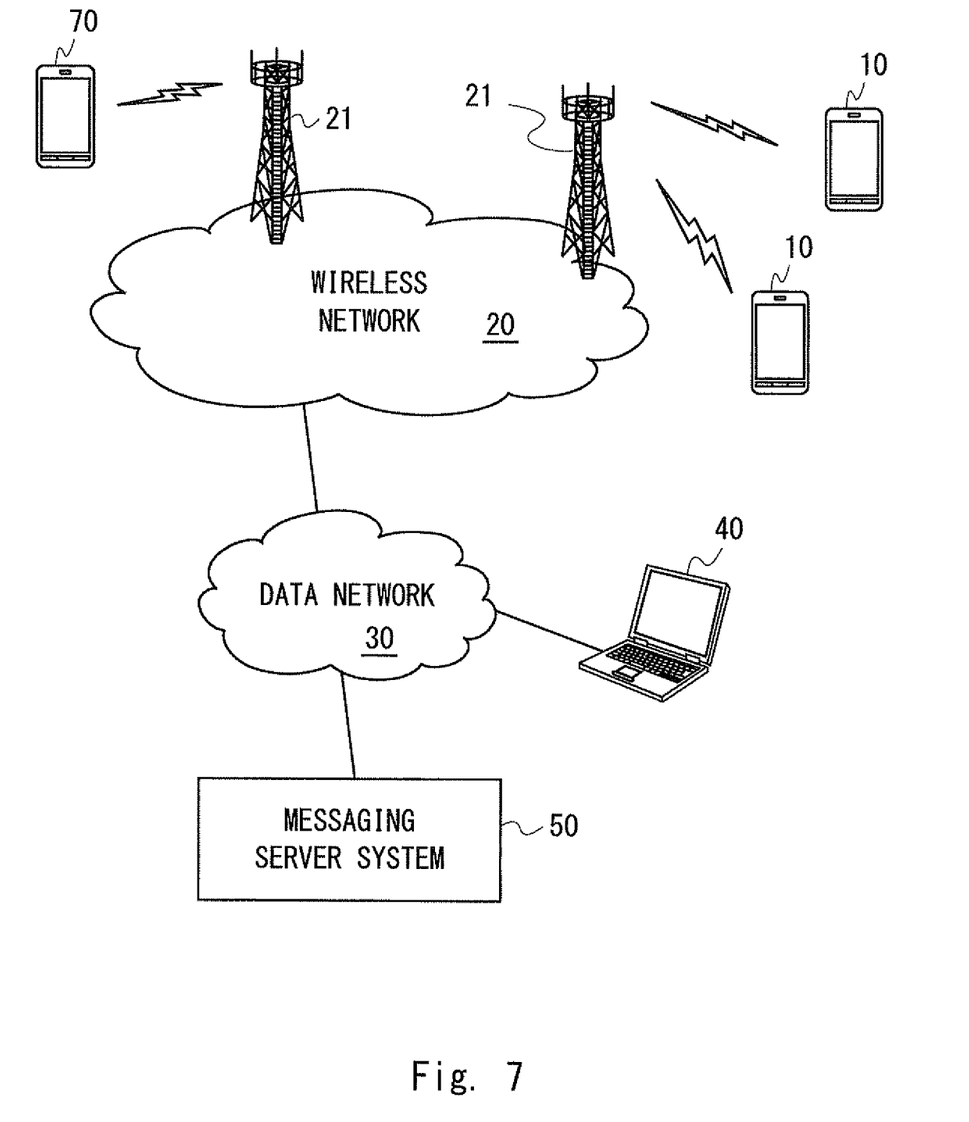
FIG. 7 is a diagram illustrating a configuration example of a system for instant messaging according to a second embodiment.
Figure 8:
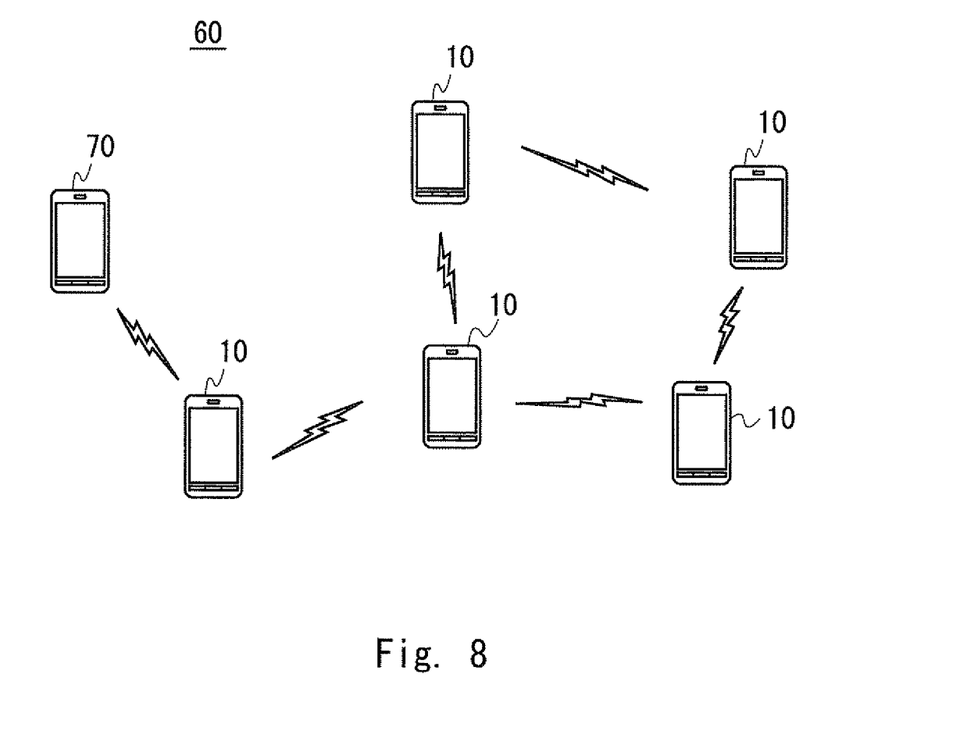
FIG. 8 is a diagram illustrating a configuration example of a system for instant messaging according to the second embodiment.

This embodiment provides a procedure in which a wireless terminal defines the activation procedure for activating the special account described in the first embodiment. FIGS. 7 and 8 show a configuration example of a system including a wireless terminal 70 according to this embodiment. As shown in FIGS. 7 and 8, the configuration example of the system according to this embodiment may be the same as that shown in FIGS. 1 and 2.

The wireless terminal 70 according to this embodiment is configured to define the activation procedure for activating the special account, create the activation verification data 123 based on the defined activation procedure, and transmit the activation verification data 123 to the wireless terminal 10 described in the first embodiment. As has been already described, the activation verification data 123 is used in the authentication procedure for activating the special account in the wireless terminal 10.

Figure 9:
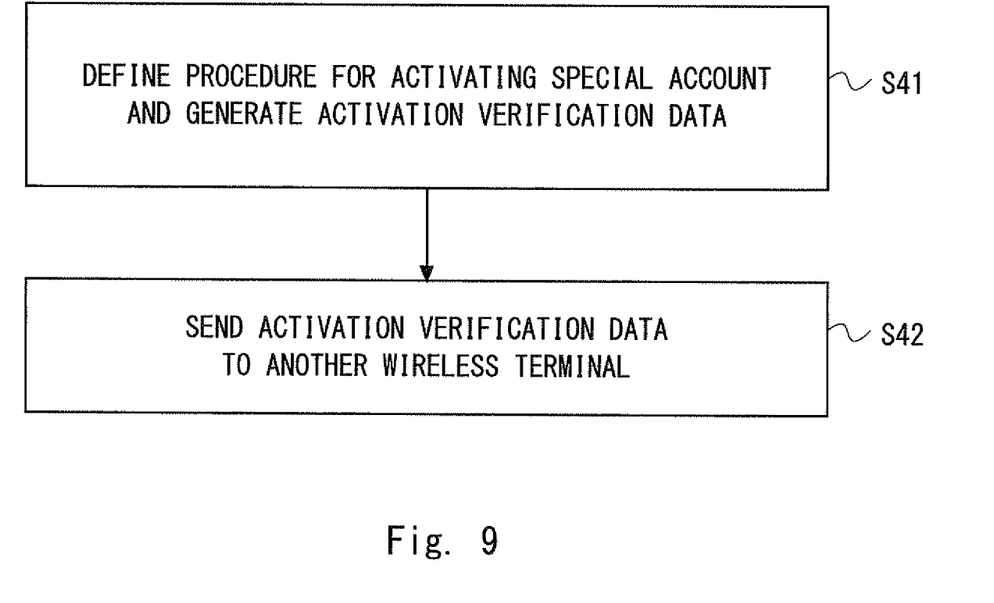
FIG. 9 is a flowchart illustrating an example of an operation of a wireless terminal according to the second embodiment.

FIG. 9 is a flowchart showing an example of an operation of the wireless terminal 70. In Step S41, the wireless terminal 70 defines the procedure for activating the special account and generates the activation verification data 123. In Step S42, the wireless terminal 70 sends the generated activation verification data 123 to the wireless terminal 10, which is permitted to activate the special account.

In some implementations, the wireless terminal 70 may send the activation verification data 123 to the wireless terminal 10 via the IM server system 50. Alternatively, in some implementations, the wireless terminal 70 may send the activation verification data 123 to the wireless terminal 10 through the wireless multi-hop network 60. Further alternatively, in some implementations, the wireless terminal 70 may send the activation verification data 123 to the wireless terminal 10 through direct communication (peer-to-peer (P2P) communication) without passing through another device or terminal, such as Wi-Fi direct, Infrared Data Association (IrDA), or Bluetooth (registered trademark). The activation verification data 123 may be encoded (e.g., two-dimensional barcode) or filed.

The wireless terminal 70 may perform the defining of the activation procedure and the transmission of the activation verification data 123 at any time. By doing so, it is possible, for example, to use the special account without passing through the IM server system 50 even if the activation procedure is not defined before an abnormal situation where the IM server system 50 cannot be accessed occurs. That is, in some implementations, the defining of the activation procedure and the transmission of the activation verification data 123 by the wireless terminal 70 may be executed in response to occurrence of an abnormal situation where the IM server system 50 cannot be accessed. Alternatively, these operations may be executed in advance to prepare for occurrence of an abnormality in the IM server system 50.

According to this embodiment, the wireless terminal 70 can permit the use of the special account in other wireless terminals 10, subject to the execution of the predetermined activation procedure.

In some implementations, the wireless terminal 70 may execute a predetermined procedure to obtain authority to define the activation procedure. In other words, a predetermined authentication procedure may be imposed on the wireless terminal 70 in order to define the activation procedure and send the activation verification data 123. By doing so, even if the wireless terminal 70 is used by an unintended third party, it is possible to prevent the special account from being activated by the third party.

As an example, the predetermined authentication procedure may include receiving, from neighboring other wireless terminals, a message(s) containing a predetermined indication used in an abnormal situation. In order to avoid an erroneous determination, the wireless terminal 70 may confirm that frequency or rate of reception of the message containing the predetermined indication exceeds a predetermined threshold. The predetermined indication may indicate, for example, that a disaster such as an earthquake has occurred (disaster occurrence flag). Alternatively, the predetermined indication may indicate that the IM application 122 is in an operation mode for exchanging messages without passing through the IM server system 50 (i.e., ad-hoc mode). It is thus possible to prevent erroneous or intentional activation of the special account in a situation other than abnormal situations.

As another example, the wireless terminal 70 may obtain authority to define the activation procedure of the special account by being approved by a plurality of wireless terminals. Specifically, the wireless terminal 70 may obtain authority to define the activation procedure in response to receiving approval messages from a plurality of wireless terminals. By doing so, even if the wireless terminal 70 is used by an unintended third party, it is possible to prevent the special account from being activated by the third party. Further, it is possible to prevent erroneous or intentional definition of the activation procedure of the special account in a situation other than abnormal situations.

In some implementations, the wireless terminal 70, which defines the activation procedure of the special account, may prevent itself from activating the special account. By doing so, even if the wireless terminal 70 is used by an unintended third party, it is possible to prevent the special account from being activated by the third party.

The activation procedure and the activation verification data 123 defined in this embodiment may include the procedure or information described in the first embodiment. The activation verification data 123 defined (created) in this embodiment may include, for example, at least one of the following information elements:

(a) a geographical condition relating to the position of the wireless terminal 10 that executes the activation procedure;

(b) a user account condition relating to the normal account that is assigned to the wireless terminal 10;
(c) a password;
(d) an operating condition relating to operations to be performed on the wireless terminal 10;
(d) a geographical range (e.g., latitude/longitude information, specific building) for which activation of the special account is permitted;
(e) a network permitted to activate the special account (e.g., specific ad hoc network);
(e) a validity period of the special account; and
(f) additional information on the special account (e.g., encryption key).

Other Embodiments

The procedures for defining the activation procedure and for obtaining the authority for defining the activation procedure, which have been described in the second embodiment, may be used by the wireless terminal 10 according to the first embodiment when it defines the activation procedure for itself.

In the above-described embodiments, the procedure for activating the special account for the messaging service (IM service) in the wireless terminal 10 without passing through the IM server system 50 has been described. However, the activation procedure described in the above embodiments can be used to activate the special account for a communication service (e.g., online service such as SNS), other than the messaging service (IM service), in the wireless terminal 10 without passing through the communication service server. Similarly, the operation of defining the activation procedure described in the second embodiment may be performed with respect to the special account for a communication service (e.g., online service such as SNS) other than the messaging service (IM service).

The processing of the wireless terminals 10 and 70 described in the above embodiments may be implemented by causing a computer system including at least one processor (e.g., microprocessor, MPU, CPU) to execute a program. Specifically, one or more programs containing instructions that cause a computer system to perform the algorithm described using the flowcharts or the like may be created and supplied to the computer.

The program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), CD-R, CD-R/W, and semiconductor memories (such as mask ROM, programmable ROM (PROM), erasable PROM (EPROM), flash ROM, random access memory (RAM), etc.). The program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g. electric wires, and optical fibers) or a wireless communication line.

The above-described illustrative embodiments are merely examples of applications of the technical ideas obtained by the inventors. The technical ideas are not limited to the above-described illustrative embodiments, and various modifications can be made thereto.

This application is based upon and claims the benefit of priority from Japanese Patent Application No. 2014-247869, filed on Dec. 8, 2014, the disclosure of which is incorporated herein in its entirety by reference.

REFERENCE SIGNS LIST

10, 70 WIRELESS TERMINAL
20 WIRELESS NETWORK
21 BASE STATION
30 DATA NETWORK
40 COMPUTER
50 MESSAGING SERVER SYSTEM
60 WIRELESS MULTI-HOP NETWORK
101 PROCESSORS
106 MEMORY
107 WIRELESS TRANSCEIVER
108 WIRELESS TRANSCEIVER
122 INSTANT MESSAGING (IM) APPLICATION
123 ACTIVATION VERIFICATION DATA
124 ACCOUNT DATA

What is claimed is:

1. A wireless terminal device comprising:
a wireless transceiver; and
at least one processor configured to create an activation procedure for activating a special account and transmit, to another wireless terminal, activation verification data to be used by the another wireless terminal for verifying correctness of the activation procedure performed by a user of the another wireless terminal, wherein
the special account is an account for using a communication service provided by a server system and has authority different from that of a normal account, and
the activation procedure includes a procedure for activating the special account in the another wireless terminal without passing through the server system in an abnormal situation where the another wireless terminal cannot access the server system, to allow the special account in the another wireless terminal to communicate with other normal accounts of other wireless terminals via a wireless multi-hop network.

2. The wireless terminal device according to claim 1, wherein the at least one processor is configured to transmit the activation verification data through the wireless multi-hop network or through peer-to-peer communication between the wireless terminal device and the another wireless terminal.

3. The wireless terminal device according to claim 1, wherein the activation verification data indicates at least one of: (a) a geographical condition relating to a position of the another wireless terminal; (b) a user account condition relating to the normal account that is assigned to the another wireless terminal; (c) password; (d) an operating condition relating to operations to be performed on the another wireless terminal; (e) a geographical range in which the activation of the special account is permitted; (f) a network permitted to activate the special account; and (g) a validity period of the special account.

4. The wireless terminal device according to claim 1, wherein the at least one processor is configured to obtain authority to define the activation procedure by executing a predetermined procedure.

5. The wireless terminal device according to claim 4, wherein the predetermined procedure includes receiving, from one or more neighboring other wireless terminals, a message containing a predetermined indication used in an abnormal situation.

6. The wireless terminal device according to claim 5, wherein the predetermined procedure includes determining that frequency or rate of reception of the message containing the predetermined indication exceeds a predetermined value.

7. The wireless terminal device according to claim 1, wherein the at least one processor is configured to obtain authority to define the activation procedure by being approved by a plurality of wireless terminals.

8. The wireless terminal device according to claim 7, wherein the at least one processor is configured to obtain authority to define the activation procedure in response to receiving approval messages from the plurality of wireless terminals.

9. The wireless terminal device according to claim 1, wherein the at least one processor is configured to prevent the special account from being activated in the wireless terminal device.

10. A method performed by at least one processor in a wireless terminal device, the method comprising:
creating an activation procedure for activating a special account; and
transmitting, to another wireless terminal, activation verification data to be used by the another wireless terminal for verifying correctness of the activation procedure performed by a user of the another wireless terminal, wherein
the special account is an account for using a communication service provided by a server system and has authority different from that of a normal account, and
the activation procedure includes a procedure for activating the special account in the another wireless terminal without passing through the server system in an abnormal situation where the another wireless terminal cannot access the server system, to allow the special account in the another wireless terminal to communicate with other normal accounts of other wireless terminals via a wireless multi-hop network.

11. The method according to claim 10, wherein said transmitting includes transmitting the activation verification data through the wireless multi-hop network or through peer-to-peer communication between the wireless terminal device and the another wireless terminal.

12. The method according to claim 10, wherein the activation verification data indicates at least one of: (a) a geographical condition relating to a position of the another wireless terminal; (b) a user account condition relating to the normal account that is assigned to the another wireless terminal; (c) password; (d) an operating condition relating to operations to be performed on the another wireless terminal; (e) a geographical range in which the activation of the special account is permitted; (f) a network permitted to activate the special account; and (g) a validity period of the special account.

13. The method according to claim 10, further comprising obtaining authority to define the activation procedure by executing a predetermined procedure.

14. The method according to claim 13, wherein the predetermined procedure includes receiving, from one or more neighboring other wireless terminals, a message containing a predetermined indication used in an abnormal situation.

15. The method according to claim 10, further comprising obtaining authority to define the activation procedure by being approved by a plurality of wireless terminals.

16. The method according to claim 10, further comprising preventing the special account from being activated in the wireless terminal device.

* * * * *